United States Patent
Lautenschlager et al.

(10) Patent No.: US 6,289,091 B1
(45) Date of Patent: *Sep. 11, 2001

(54) METHOD OF MAKING CHANGES IN A DIRECTORY NUMBER ADMINISTRATION, AND DIRECTORY NUMBER ADMINISTRATION FACILITY

(75) Inventors: Wolfgang Lautenschlager, Weissach-Flacht; Uwe Stahl, Leonberg, both of (DE)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,867

(22) Filed: Sep. 18, 1997

(30) Foreign Application Priority Data

Sep. 20, 1996 (DE) .............................. 196 38 823

(51) Int. Cl.⁷ .................................... H04M 3/42
(52) U.S. Cl. .................. 379/207.02; 379/220.1; 379/229; 379/230; 379/221.01
(58) Field of Search .............. 379/219, 220.01, 379/207.02, 229, 230, 221.01

(56) References Cited

U.S. PATENT DOCUMENTS

| | | | |
|---|---|---|---|
| 4,754,479 | * 6/1988 | Bicknell et al. | 379/207 |
| 4,899,373 | * 2/1990 | Lee et al. | 379/207 |
| 5,359,646 | * 10/1994 | Johnson et al. | 379/27 |
| 5,513,171 | * 4/1996 | Ludwiczak | 379/219 |
| 5,608,720 | * 3/1997 | Biegel et al. | 370/249 |
| 5,867,570 | * 2/1999 | Bargout et al. | 379/207 |
| 5,912,962 | * 6/1999 | Bosco | 379/219 |
| 5,926,536 | * 7/1999 | Orlamunder et al. | 379/221 |
| 6,044,259 | * 3/2000 | Hentila et al. | 455/406 |
| 6,091,809 | * 7/2000 | Stahl et al. | 379/207 |

FOREIGN PATENT DOCUMENTS

| | | |
|---|---|---|
| 3315899 | 11/1984 | (DE) . |
| 0695100 | 1/1996 | (EP) . |
| 2263845 | 8/1993 | (GB) . |
| 2270608 | 3/1994 | (GB) . |
| 1278152 | 11/1989 | (JP) . |
| 8802205 | 3/1988 | (WO) . |
| 9615633 | 5/1996 | (WO) . |

OTHER PUBLICATIONS

"ITT 1240 Digital Exchange Operations and Maintenance" by E. Bertoli et al, Electrical Communication from the Technical Journal, vol. 56, No. 2/3, 1981, pp. 184–197.

* cited by examiner

Primary Examiner—Ahmad Matar
Assistant Examiner—William J. Deane, Jr.
(74) Attorney, Agent, or Firm—Ware, Fressola, Van Der Sluys & Adolphson LLP

(57) ABSTRACT

The invention concerns a method of making changes in a directory number administration (DNA), a directory number administration facility whereby changes are made in accordance with this method, and a method for providing a directory number administration service via such a directory number administration. The directory number administration (DNA) manages the assignment of a quantity of subscriber stations to call numbers. To make a change in this assignment, a change order is entered into the directory number administration and the change takes place when the change order is executed by the directory number administration (DNA). However the change order is not executed immediately by the directory number administration (DNA) when a change order is entered. A connection is established between a subscriber terminal (TE) and the directory number administration (DNA), and a trigger message (TRIG) is sent from the subscriber terminal (TE) to the directory number administration (DNA) via the established connection. The execution of the change order is finally released when the trigger message (TRIG) is received.

15 Claims, 2 Drawing Sheets

METHOD OF MAKING CHANGES IN A DIRECTORY NUMBER ADMINISTRATION, AND DIRECTORY NUMBER ADMINISTRATION FACILITY

TECHNICAL FIELD

The invention concerns a method of making changes in a directory number administration whereby the directory number administration manages the assignment of a quantity of subscriber stations to call numbers, a change order is entered into the directory number administration to make a change in this assignment, and the execution of the change order makes the change in the directory number administration. It is also directed to a method of providing a directory number administration service whereby the directory number administration service manages the assignment of all the subscriber stations of one or several communications networks to call numbers, and a change is made in this assignment by executing a change order in the directory number administration service. The invention is still further directed to a directory number administration facility with a first data bank for managing the assignment of a quantity of subscriber stations to call numbers, and with a control unit to make a change in this assignment by executing a change order.

BACKGROUND OF THE INVENTION

The management of numbers is an important task in the operation of communications networks. It includes managing the assignment of subscriber stations to call numbers, i.e. managing the addressing of subscriber terminals in communications networks.

The article "System 12, Operation and Maintenance" by E. Bertoli et al., Electrical Communications Volume 56, number 23, 1981, pages 184 to 197 describes the realization of a directory number administration for a part of a telephone network. The invention starts with this realization of a directory number administration.

The assignment of call numbers to the subscriber stations of one or several exchanges is controlled by a central operation and maintenance system. This assignment is changed by blocking and releasing subscriber station lines and by changing the routing guidance tables of the exchanges. The implementation of such a change is brought about by personnel of the operation and maintenance center with the input of a corresponding change order.

The execution of such changes is a management task for the network operator and involves high safety requirements. For that reason such a change order can only be entered by predetermined personnel of the operation and maintenance center and the personnel must be identified with passwords.

Problems occur with this type of changes in the assignment of call numbers if installers must perform local work in the respective subscriber station before the change is made.

This is particularly the case in a deregulated subscriber station area in which the subscriber networks of two or more network operators share the subscriber station area and thereby also the numbering range of the subscriber area. If a subscriber changes from one network operator to another, an installer must reconnect the subscriber's terminal from one station in the subscriber network of one network operator to a station of the other network operator. The subscriber cannot be reached during the time between the reconnecting and the input of the change orders by the personnel of the operation and maintenance center of the subscriber networks.

SUMMARY OF THE INVENTION

The invention has the task of introducing a way to make changes in the assignment of call numbers to subscriber stations with a high degree of subscriber reachability.

The task is fulfilled by a method of making changes in a directory number administration whereby the directory number administration manages the assignment of a quantity of subscriber stations to call numbers, a change order is entered into the directory number administration to make a change in this assignment, and the execution of the change order makes the change in the directory number administration, wherein a connection is established between a subscriber terminal and the directory number administration, that a trigger message is sent from the subscriber terminal to the directory number administration via the established connection, and that the reception of the trigger message causes the directory number administration to carry out the change order.

The task is also fulfilled by a method of providing a directory number administration service whereby the directory number administration service manages the assignment of all the subscriber stations of one or several communications networks to call numbers, and a change is made in this assignment by executing a change order in the directory number administration service, wherein to change an assignment a connection is established between a subscriber terminal and the directory number administration service, that a trigger message is sent from the subscriber terminal to the directory number administration via the established connection, and that the reception of the trigger message causes the directory number administration to execute the change order.

The task is further fulfilled by a directory number administration facility with a first data bank for managing the assignment of a quantity of subscriber stations to call numbers, and with a control unit to make a change in this assignment by executing a change order, wherein the control unit has a communications unit for establishing a connection between a subscriber terminal and the directory number administration, and an access device which has a receiver unit for receiving a trigger message from the subscriber terminal via the established connection, and is designed so that upon receiving the trigger message it executes the change order via the control unit.

The basic idea of the invention is to enter a change order in a directory number administration, but the execution of this change order only takes place upon the reception of a trigger message which is sent from a subscriber terminal to the call directory number administration. This uncouples the input of an order, which is safety-critical and must be accurate, from the execution of the order. For example the trigger message is sent to the directory number administration by an installer via a subscriber terminal immediately after reconnecting the subscriber line of a terminal. This enables the execution of the order and thereby allows the change in the switching function to take place immediately after the corresponding change in the physical connection line. This improves the subscriber's reachability.

Another advantage of the invention is that both the time of the input of an order as well as the local reconnection are made flexible by the uncoupling.

The use of this invention is an advantage for the directory number administration in a deregulated subscriber station area, particularly if call number transferability is required.

BRIEF DESCRIPTION OF THE DRAWINGS

The invention will be explained in the following by means of a configuration example for example with the help of the attached drawings, wherein.

BEST MODE FOR CARRYING OUT THE INVENTION

The configuration example now explains carrying out the method of the invention to make changes in a directory number administration, and to provide a directory number administration service in a communications environment by means of a directory number administration facility according to the invention.

Figure 1:
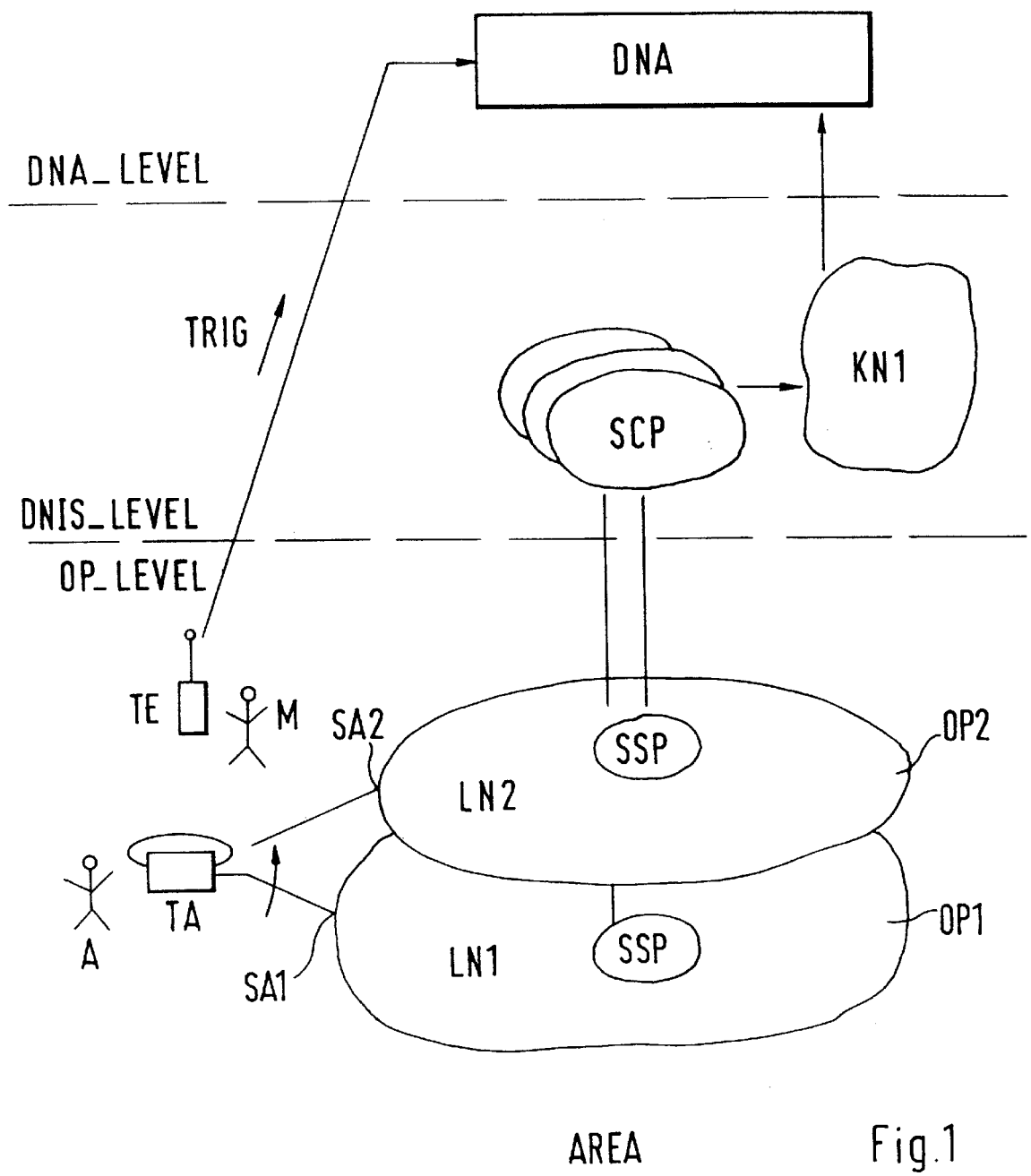
FIG. 1 illustrates a block circuit diagram of a communications system with a directory number administration facility according to the invention.

FIG. 1 illustrates a section of a communications system with three planes DNA_LEVEL, DNIS_LEVEL and OP_LEVEL.

The OP_LEVEL planes represent the network operator plane and as such particularly comprise the communications networks of the communications system. These communications networks are assigned to different network operators. The DNIS_LEVEL plane represents the plane that provides the service. It comprises the service control devices which provide services in the communications networks of the communications system. The services may be assigned to different service operators in this case. The DNA_LEVEL plane represents the directory number administration plane. It provides a central directory number administration service in the communications system, which manages the assignment of call numbers to subscriber stations for all or for some of the communications networks of the communications system. This plane can also contain several of such directory number administration services which are assigned to different directory number administration operators.

In the configuration example represented by the following, the directory number administration for communications networks of the OP_LEVEL plane is provided centrally by a directory number administration service of the DNA_LEVEL plane. Services of the DNIS_LEVEL planes are used for the transfer of the assignment which is managed by the directory number administration service.

Of the components in the OP_LEVEL plane, FIG. 1 illustrates the example of a subscriber network area AREA with two subscriber networks LN1 and LN2 and two subscriber terminals TE and TA. Terminal TA is assigned to subscriber A and terminal TE is assigned to an installer M.

The subscriber networks LN1 and LN2 are subscriber line networks for connecting telephone terminals and private branch exchanges. In this case potential telephone terminals which can be connected to the subscriber networks LN1 and LN2 are telephones, fax machines and also modems and interface cards for connecting data processing installations. Terminal TA is such a terminal.

The subscriber networks LN1 and LN2 are assigned to two different subscriber network operators OP1 and OP2 and each is formed by one or several subscriber exchanges. All the terminals of the subscribers assigned to one of the subscriber networks LN1 and LN2 are connected by a subscriber line to a subscriber station of the exchange of the respective subscriber line network. Because of the higher traffic load, larger subscriber line networks can also contain transit switching centers. The exchanges of one of the subscriber networks LN1 and LN2 are interconnected by transverse lines and to one or several transit switching centers by trunk networks not illustrated here, which are assigned to different trunk network operators. Transverse lines to the other subscriber exchanges of the subscriber station area AREA are also possible.

Of the exchanges in the subscriber network LN1, one exchange SSP1 or SSP2 is illustrated. These exchanges are specially configured exchanges, namely service exchanges which provide access to the services of the respective subscriber network. One of the services provided by them is to reroute a connection request to that one of several subscriber networks in a subscriber network area to which the subscriber station, which is identified by the call number in the connection request, is assigned. In this case every connection request that is generated in the subscriber network area is routed to these service exchanges for reevaluation.

However it is also possible that only connection requests directed to predetermined targets are routed to the service exchanges for reevaluation. Particularly only those connection requests are routed to a service exchange, which are directed to a terminal of a subscriber station area that is shared by the subscriber networks of several different network operators.

In addition to the subscriber networks LN1 and LN2, subscriber networks of other subscriber network areas, or one or more trunk networks, can be equipped with service exchanges that provide the above services.

The establishment of a connection between the terminals of a communications system takes place via the communications networks of the OP_LEVEL plane. While the connection is being made, the call number is reevaluated by a service provided by the DNIS_LEVEL plane. The assignment between the subscriber station to which the connection is being made and the dialed number of the preceding connection request, is determined by this reevaluation in accordance with an assignment established in the service.

The DNIS_LEVEL plane has several service control devices SCP and a communications network KN1. The service control devices SCP are used to bring about the services provided by the service exchanges SSP1 and SSP2. They are constructed in accordance with the IN (Intelligent Network) architecture and operate together with the service exchanges assigned to them according to this architecture, of which only the service exchanges SSP1 and SSP2 are illustrated here. One or several service exchanges are connected to each service control device SCP; they can also be assigned to subscriber networks or to trunk networks of different network operators. As a rule however, one service control device belongs to one network or a network area of a network operator.

To provide the services, each of the service control devices SCP has a data bank and a control logic. The data bank contains an assignment of call numbers to subscriber stations. Such an assignment consists for example of a list of logic subscriber call numbers to which one or several physical subscriber call numbers are assigned. The physical address of the subscriber station can be found in such a physical subscriber call number, for example the subscriber network of a subscriber network area to which the subscriber station is assigned, and the exchange within this subscriber network which provides the subscriber station.

By means of the data bank the control logic determines a physical subscriber number from the subscriber numbers assigned to a connection request, and returns this physical call number as a reevaluated call number to the respective service exchange. With this reevaluated call number, the particular subscriber network of a subscriber network area containing the addressed subscriber station can be found.

Linking a service with such a data bank to the routing guidance allows to freely dial the assignment of call numbers to the subscriber networks of a subscriber network area, thus the numbering range of the subscriber station area enables the free transfer of call numbers between the network operators within this subscriber network. In this case the assignment of the call numbers from such a subscriber station area to the subscriber stations of these different subscriber networks takes place in accordance with the assignment stored in the data banks of the service control devices SCP; the service provided by the service exchanges SSP1 and SSP2 and the service control devices SCP is used to reevaluate this assignment when the connection is established.

The communications network KN1 is a data network, for example an X.25 network or a no. 7 signalling network. In this case it is an advantage if the communication between the service control devices SCP and the directory number administration facility is routed via a service management facility which would then be part of the communications network KN1. This service management facility would provide the functions of a service management point (SMP) in accordance with the IN architecture.

The DNA_LEVEL plane has a directory number administration DNA which is connected to the service control devices SCP via the communications network KN1.

The directory number administration DNA has a data bank which stores an assignment of call numbers to subscriber stations. The communications network KN1 synchronizes the data banks of the service control devices with this data bank, i.e. the data banks of the service control devices always store an assignment that corresponds to the assignment stored in the directory number administration facility. The directory number administration facility DNA furthermore manages this assignment and makes changes in this assignment.

For example if subscriber A, to whom the terminal TA is assigned, changes from network operator OP1 to network operator OP2 within the subscriber station area AREA, the subscriber line of his terminal TA must be reconnected by an installer M from a subscriber station SA1 of subscriber network LN1 to a subscriber station SA2 of subscriber network LN2.

To continue reaching the subscriber after the reconnection, from that time on connection requests with the call number of subscriber A must no longer be routed to subscriber station SA1 but rather to subscriber station SA2. To that end the directory number administration facility DNA receives a change order which contains the change from the assignment of subscriber station SA1 to the call number of subscriber A, into the assignment of subscriber station SA2 to said call number. However the execution of this order only takes place after the reception of a trigger message TRIG sent after the reconnection by the installer M via his subscriber terminal TE to the directory number administration facility DNA.

By synchronizing the data banks in the service control devices SCP with those of the directory number administration facility DNA, this change in assignment is also entered into these data banks. To establish a connection the call number is now reevaluated according to this new assignment and a request for a connection to the call number of subscriber A is thus immediately established to subscriber station SA2. The installer can also send the trigger message TRIG immediately before the reconnection.

It is also possible to integrate the directory number administration facility in one of the service control devices SCP and in this way to make assignment changes directly in the data bank of the service control device. In this case the data banks of the other service control devices can be synchronized with the data bank of this service control device.

It is furthermore possible for the reevaluation of the assignment, which is managed by the directory number administration DNA, of subscriber stations to call numbers of subscribers in the routing guidance of the establishment of the connection, to be performed in other ways than described above.

A further such possibility is that no services are switched on when a connection is established, and that the establishment of the connection takes place only on the basis of the routing guidance tables in the exchanges of the communications system. In that case the directory number administration facility DNA would have to be connected to one or several of these exchanges and a change in the assignment made by the directory number administration facility DNA would be reevaluated by a corresponding change in the respective routing guidance tables.

In this case it is also possible for the directory number administration facility DNA to be integrated in this or in one of these exchanges.

Another possibility is for the data bank to store only assignments for transferred call numbers. This applies when in a subscriber station area with several different subscriber network operators blocks of call numbers, for example blocks of 10,000, are firmly assigned to these subscriber network operators. Transferred call numbers in this case are those call numbers which do not fit this pattern, thus where the subscriber network with the assigned subscriber network does not correspond to the numbers block of the call number. A reevaluation by means of the assignment stored in the data bank only takes place if a connection request with such a transferred call number is recognized. With this solution it is also advantageous for the call directory number administration facility to establish a communications connection to the exchanges and to identify the transferred call numbers contained in the data bank as transferred to the exchanges of the other subscriber networks of the pertinent subscriber station area.

Another possibility is for the data banks to store an assignment of call numbers to operators and thereby to subscriber networks as the assignment of subscriber stations to call numbers. Based on this assignment, further routing of a connection request takes place to that subscriber network in which the subscriber station that is assigned to the call number is settled. In this case the physical subscriber call number contains for example the logic subscriber call number and an operator identification.

Another possibility is for the directory number administration facility to have access to reevaluation tables of services as well as to routing guidance tables in exchanges, and to establish the call number assignment to subscriber stations by means of these two potential influences.

Figure 2:
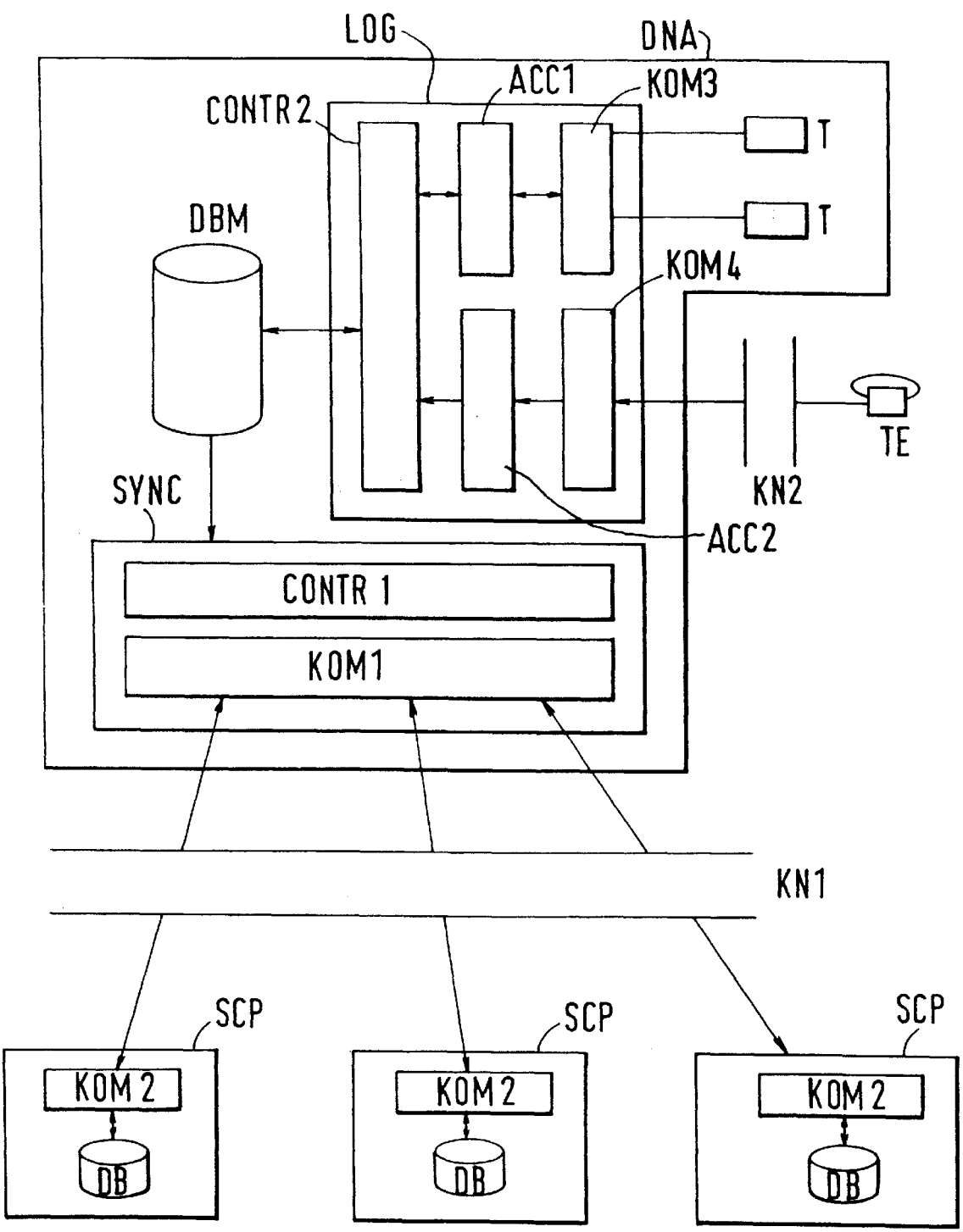
FIG. 2 illustrates a detailed block circuit diagram of a section of the communications system in FIG. 1.

The detailed construction of the directory number administration facility DNA is now explained by means of FIG. 2, which illustrates the directory number administration facility DNA, a communications network KN2, the terminal TE, the communications network KN1 and the service control devices SCP.

The directory number administration facility DNA contains a data bank DBM, two service terminals T, a control unit LOG and a synchronization unit SYNC. The control unit LOG exchanges data with the service terminal T, it receives data from the terminal TE and has reading and writing access to the data in the data bank DBM. The synchronization unit SYNC exchanges data with the service control units SCP and has reading access to the data bank DBM.

A number of assignments of subscriber call numbers to subscriber stations is stored in the data bank DBM. Such assignments comprise for example an assignment of logic to physical subscriber numbers or an assignment of operator identifications to logic subscriber call numbers. Such an assignment is provided for every subscriber station of the communications system that is equipped with a terminal.

It is also possible for the data bank DBM to store only the assignments for one or several of the networks in the communications system. For example this selection could be the communications networks of different network operators who share the same subscriber station area. A further possibility is that this selection is a special numbering range. The selection of a network operator is possible as well.

It is also possible that only assignments for a part of the subscriber stations of a communications network are stored in the data bank DBM. These could for example be the subscriber stations whose logic subscriber call number does not coincide with the physical subscriber call number.

The synchronization unit SYNC has a control logic CONTR1 and a communications unit KOM1. Each of the service control units SCP has a communications unit KOM2 and a data bank DB.

The control logic CONTR1 is responsible for synchronizing the data banks DB with the data bank DBM. In this way the data bank DBM represents the master data bank for the data banks DB.

A possible method that is performed by the control logic CONTR1 for the synchronization is that it recognizes every change in the assignments of the data bank DBM and immediately sends a control message to the data banks DB with the command to perform the same change therein. In that case it is also possible for each of the data banks DB to possess only part of the data in the data bank DBM, for example only assignments that concern a predetermined numbering range or a predetermined network operator. In that case the control messages would only be sent to those of the service control units whose data bank DB stores the changed assignments.

The communications units KOM1 and KOM2 provide all the types of software and hardware services that are required to exchange control messages between the synchronization unit SYNC and the service control units via the communications network KN1.

The control unit LOG is responsible for managing the assignments of call numbers of subscribers to subscriber stations which are stored in the data bank DBM. It has a control logic CONTR2, two access units ACC1 and ACC2 and two communications units KOM3 and KOM4.

The communications unit KOM3 contains all the function groups required for connection of the service terminal T. The service terminals in this case are computer terminals or PC's whereby change orders can be entered to change the assignment of call numbers to subscriber stations, or to newly install such an assignment. Together with the communications unit KOM3, the service terminals T provide a man-to-machine interface which supports the input of such orders.

It is also possible that the service terminals T are not part of the directory number administration facility DNA and are installed away from the directory number administration facility DNA. The service terminals can be located for example in the operating areas of the different network operators of the communications system. Communication between the service terminals T and the communications unit KOM3 would then take place via one or several data communications networks, for example via the INTERNET.

The access unit ACC1 performs a change order safety check. It checks whether such a change order was entered into a service terminal T that is authorized therefor, and whether an identification by means of a valid password took place before the input.

The control logic CONTR2 accesses the data bank DBM and executes change orders. In that case the change orders entered via the service terminal T are temporarily stored in the control logic until a trigger message from the access unit ACC2 is received. Only upon reception of this trigger message can the change order be executed.

It is also possible to enter different types of change orders into the control unit LOG, for example one type which is executed immediately and another type is provided with a time when the order is to be executed.

It is furthermore possible to assign a predetermined period of time when entering an order, or automatically. The order is only executed subsequently by the control logic if the trigger message is received within this assigned period of time.

The communications unit KOM4 provides the functions required to establish a connection between the control unit LOG and the terminal TE via the communications network KN2.

It is an advantage if the communications network KN2 is a mobile radio network, for example in accordance with the GSM standard. However it can also be a fixed network. The communications network KN2 can also comprise several communications networks. In that case they can also be communications networks of the communications system.

The access unit ACC2 checks and decides whether a trigger message received via the communications unit KOM4 is accepted as a trigger message to release the execution of a change order.

To that end a very specific trigger message is assigned to each execution order, which contains a sequence of DTMF signals for example. A trigger message is only accepted if the received trigger message coincides with the assigned trigger message.

A trigger message could also contain a general authorization identification or authorization code and an order number or order identification which designates the change order. If the authorization identification is correct, a trigger message received in this manner is accepted as a trigger message for the change order with the received order number.

It is furthermore possible for the access unit ACC2 to check the origin of the call, namely the call number of the terminal TE. This is particularly feasible if the terminal TE is an ISDN (Integrated Services Digital Network) terminal. A trigger message is only accepted by one or by several predetermined terminals or by the terminals of a closed user group. This allows the security to be enhanced further.

What is claimed is:

1. A method of making changes in a directory number administration (DNA) whereby the directory number administration (DNA) manages the assignment of a quantity of subscriber stations (SA1, SA2) to call numbers, a change order is entered into the directory number administration (DNA) to make a change in this assignment, and the execution of the change order makes the change in the directory number administration (DNA), characterized in that a connection is established between any subscriber terminal (TE) and the directory number administration (DNA) by way of a subscriber station (SA1, SA2) of a subscriber network (LN1, LN2), that a trigger message (TRIG) uncoupled from the change order is sent from the subscriber terminal (TE) to the directory number administration (DNA) via the established connection by a human operator (M), and that the reception of the trigger message (TRIG) causes the directory number administration (DNA) to carry out the change order, wherein the method allows different potential terminals to be connected to the subscriber networks (LN1, LN2).

2. A method as claimed in claim 1, characterized in that the directory number administration (DNA) manages the assignment of call numbers to all the subscriber stations of one or several communications networks (LN1, LN2).

3. A method as claimed in claim 1, characterized in that the directory number administration (DNA) manages the assignment of the call numbers to the subscriber stations of two or more communications networks (LN1, LN2) which share a common call numbering area.

4. A method as claimed in claim 3, characterized in that the change order causes a change in the assignment of a call number to a subscriber station (SA1) of a first (LN1) of the communications networks, into an assignment of the call number to a subscriber station (SA2) of a second (LN2) of the communications networks.

5. A method as claimed in claim 1, characterized in that it is checked whether the connection for transmitting the trigger message (TRIG) is established from a defined original number to a defined target call number, and only then allows the order to be executed.

6. A method as claimed in claim 5, characterized in that the original number is the call number whose assignment is being changed.

7. A method as claimed in claim 5, characterized in that the original number is a call number of a closed user group.

8. A method as claimed in claim 1, characterized in that an authorization identification is sent along with the trigger message (TRIG) and only allows an order to be executed by the directory number administration (DNA) if the transmitted authorization identification corresponds to an authorization identification that is assigned to the order.

9. A method as claimed in claim 1, characterized in that a time frame is assigned to the order and the order is only executed if the trigger message (TRIG) is received within the assigned time frame.

10. A method as claimed in claim 1, characterized in that the connection to the subscriber terminal is established via a mobile radio network (KN2).

11. The method of claim 1 wherein the reception of the trigger message (TRIG) causes the directory number administration (DNA) to execute the change order with substantial immediacy.

12. A method of providing a directory number administration service (DNA) whereby the directory number administration service (DNA) manages the assignment of all the subscriber stations (SA1, SA2) of one or several communications networks (LN1, LN2) to call numbers, and a change is made in this assignment by executing a change order in the directory number administration service (DNA), characterized in that to change an assignment a connection is established between any subscriber terminal (TE) and the directory number administration service (DNA) by way of a subscriber station (SA1, SA2) of a subscriber network (LN1,LN2), that a trigger message (TRIG) uncoupled from the change order is sent from the subscriber terminal (TE) to the directory number administration (DNA) via the established connection by a human operator (M), and that the reception of the trigger message (TRIG) causes the directory number administration (DNA) to execute the change order, wherein the method allows different potential terminals to be connected to the subscriber networks (LN1, LN2).

13. A directory number administration facility (DNA) with a first data bank (DBM) for managing the assignment of a quantity of subscriber stations to call numbers, and with a control unit (LOG) to make a change in this assignment by executing a change order, characterized in that the control unit (LOG) has a communications unit (KOM4) for establishing a connection between any subscriber terminal (TE) and the directory number administration (DNA) by way of a subscriber station (SA1, SA2) of a subscriber network (LN1, LN2), and an access device (ACC2) which has a receiver unit (KOM4) for receiving a trigger message (TRIG) that is uncoupled from the change order and is sent by a human operator (M) from the subscriber terminal (TE) via the established connection, and is designed so that upon receiving the trigger message (TRIG) it executes the change order via the control unit (LOG), wherein different terminals are potentially connected to the subscriber networks (LN1, LN2).

14. A directory number administration facility as claimed in claim 13, characterized in that the first data bank is equipped with an interface device designed to enable one or several exchanges to access the data bank.

15. A directory number administration facility as claimed in claim 13, characterized in that the first data bank is equipped with a synchronization device (SYNC) for synchronizing two or more second data banks (DB) with the first data bank (DBM).

* * * * *